United States Patent [19]

Matsubara

[11] Patent Number: 4,965,617
[45] Date of Patent: Oct. 23, 1990

[54] PLATE FOR LIGHT SHIELDING BLADE

[75] Inventor: Takashi Matsubara, Tokyo, Japan

[73] Assignee: Nikon Corporation, Tokyo, Japan

[21] Appl. No.: 365,301

[22] Filed: Jun. 13, 1989

[30] Foreign Application Priority Data

Jun. 17, 1988 [JP] Japan .................................. 63-148263

[51] Int. Cl.$^5$ ............................................... G03B 9/40
[52] U.S. Cl. ...................................... 354/246; 350/273;
428/113; 428/408
[58] Field of Search ......................... 354/226, 245–249,
354/250; 350/272, 273, 266; 428/113, 408, 288

[56] References Cited

U.S. PATENT DOCUMENTS 4,482,231 11/1984 Kato et al. ........................... 354/246

FOREIGN PATENT DOCUMENTS 59-61827 4/1984 Japan .
60-63825 5/1985 Japan .
62-199439 9/1987 Japan .
63-17435 1/1988 Japan .

Primary Examiner—Brian W. Brown
Attorney, Agent, or Firm—Shapiro and Shapiro

[57] ABSTRACT

A thin plate composed of a carbon fiber reinforced plastic laminate of at least three reinforced resin sheets, in which each of the reinforced resin sheets is composed of continuous carbon fibers oriented in a perdetermined direction and matrix resin enveloping the continuous fibers, the intermediate sheet contains black pigment in an amount of 5 to 15 wt. %, the outer sheets are substantially devoid of black pigment, and the thin plate has a thickness of 60 to 120 μm.

14 Claims, 2 Drawing Sheets

PLATE FOR LIGHT SHIELDING BLADE

BACKGROUND OF THE INVENTION

1. Field of the Invention

The present invention relates to a plate for use as a light shielding blade that is required to move at a high speed, such as shutter blades of a focal plane shutter or a lens shutter of a camera, or diaphragm blades thereof.

2. Related Background Art

For such light shielding blades, there are required a small actuating force and a sufficient bending rigidity, in addition to the ability for high-speed movement.

For meeting these requirements, there is required a light shielding blade of light weight, high strength and high elasticity.

The present inventor has investigated a plastic sheet reinforced with continuous carbon fibers oriented in a predetermined direction (hereinafter referred to as CFRP (carbon fiber reinforced plastic) sheet), and identified that a plate material obtained by laminating a plurality of such sheets with mutually orthogonal or substantially orthogonal fiber directions was suitable as the material for light shielding blades capable of high speed movement in view of weight, strength and ease of manufacture (cf. Japanese Laid-open Pat. No. Sho 59-61827).

In this case, said plate material is produced by laminating a plurality of prepreg sheets which are precursors of CFRP sheets in such a manner that the directions of fibers mutually cross orthogonally or substantially orthogonally, and hardening the entire laminate by heating in a pressed state.

Said prepreg sheet is obtained by aligning continuous carbon fibers in a direction, in the form of a thin plate, impregnating said carbon fibers with thermosetting resin liquid which is a precursor of matrix resin (for example unhardened liquid of epoxy resin or unsaturated polyester) and transforming said resin liquid into so-called B-stage, in which the resin is already solidified and lacks fluidity but can be finally hardened by heating. It has a low resin content, and, in appearance, it looks like a bundle of hair-like carbon fibers each thinly coated with glue-like resin liquid.

However, such plate material is almost unable to provide complete light shielding property only by the carbon fibers because of its small thickness, and is always associated with translucent portions scattered like pinholes. This fact leads to a high wastage rate in the cutting for preparing light shielding blades, and thus to a higher production cost of such blades.

For this reason it is an attractive proposal to mix black pigment (carbon black) in the matrix resin of the CFRP sheet, in addition to the carbon fibers, thereby filling the gaps of the carbon fibers with said pigment and thus improving the light shielding property.

However, the plate material obtained by laminating the sheets with black pigment dispersed in the matrix resin has been associated with poor flatness.

Also such plate material has often shown microcracks and cavities, giving rise to local loss of strength and having often resulted in defects in the connecting part with a driving system. Also in appearance, there have been observed formation of microcracks and striped patterns.

The material with such appearance has been associated with poor receptivity for black lubricating coating (hereinafter called DL coating) to be applied in a later stage for the purpose of improving abrasion resistance, scratch resistance, lubricating ability, light shielding ability and appearance.

SUMMARY OF THE INVENTION

The object of the present invention is to provide a plate material for light shielding blades which avoids with the drawbacks of the conventional CFRP laminated plate material, and which is provided with satisfactory light shielding property, improved flatness and improved receptivity for the DL coating.

This object can be attained, according to the present invention, by not mixing carbon black in the sheets of surface layers, and fixing carbon black in the intermediate layer or layers other than the surface layers in front and back.

For obtaining the plate material of the present invention, there are required at least two prepreg sheets for the surface layers and a prepreg sheet for the intermediate layer.

In the preparation of the prepreg sheet to be used in the intermediate layer, carbon black is added and dispersed in the resin liquid which is the precursor of the matrix resin. The carbon black preferably has an average particle size not exceeding 0.07 $\mu$m, and is preferably added in an amount of 5 to 15 wt. % with respect to the solid content of, the resin liquid.

Carbon black is preferably not added to the prepreg sheets use for the surface layers.

The above-mentioned sheets (two kinds) are superposed in such a manner that the directions of carbon fibers are mutually orthogonal or substantially orthogonal between the surface layer and the intermediate layer, and that said sheets are symmetrical with respect to the central plane, and said sheets are then press molded to obtain the plate material.

The thickness of the plate material is selected in a range of 60 to 120 $\mu$m depending on the purpose of use, so that the thickness of a prepreg sheet is in the order of 10 to 60 $\mu$m. The amount of the carbon fibers is 10 to 60 g/m$^2$.

All the prepreg sheets need not be of a same thickness, and sheets of different thicknesses may be combined as long as the structure is symmetrical with respect to the central plane.

The improved flatness of the thus obtained plate material is presumably due to the fact that the arrangement of fibers is not disturbed in the surface layers, as the absence of pigment does not increase the viscosity of the resin liquid. Conversely, if a pigment-free prepreg sheet is used in the intermediate layer and pigment-containing prepreg sheets are used for the surface layers, the flatness is deteriorated due to the undesirable distribution of internal stress of the outermost layers distant from the central plane, so that the production yield is drastically lowered, even if the light shielding property can be maintained. According to the present invention, since the absence of pigment in the surface layers suitably reduces the viscosity of the resin liquid, the plate material does not show formation of cavities or microcracks, and thus satisfactorily accepts the DL coating. If the carbon black-containing prepreg sheets are used for the surface layers, the resin is often unable to completely cover the surfaces (formation of microcracks). Thus the DL coating tends to become inhomogeneous, with uneven appearance, so that the abrasion resistance, lubricating ability and aesthetic appearance cannot be made satisfactory. Also the pigment may show, in the resin flow, streak patterns undesirable from an aesthetic point of view.

The matrix resin in the surface layers is preferably completely free from pigment, but the plate material of the present invention may still contain pigment in an amount less than 5 wt. % with respect to 100 parts by weight of the resin.

On the other hand, the pigment in the intermediate layer cannot provide sufficient light shielding effect in an amount less than 5 wt. %, and it will undesirably affect the fiber arrangement even in the intermediate layer, thus deteriorating the flatness, in an amount equal to or exceeding 15 wt. %. Also the pigment reduces fluidity of the resin liquid, thereby leading to formation of internal cavities or interlayer peeling, so that preferred is an addition of 5–15 wt. % with respect to 100 parts by weight of the resin.

DESCRIPTION OF THE PREFERRED EMBODIMENTS [1st embodiment]

Figure 1:
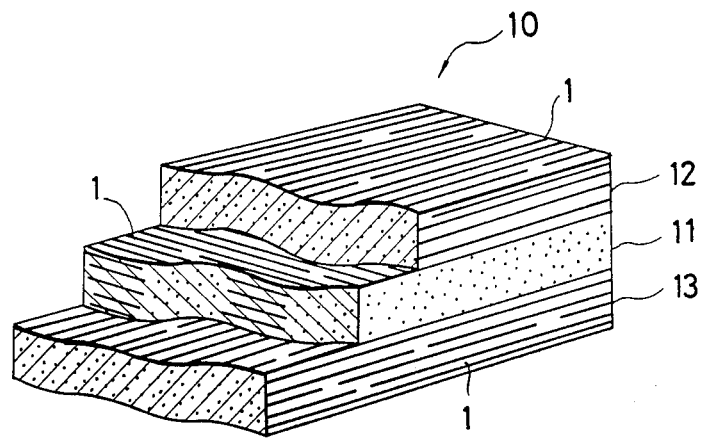
FIGS. 1 and 2 are perspective views respectively showing first and second embodiments of the plate for light shielding blade of the present invention.

FIG. 1 depicts a first embodiment of the invention made with 3 prepreg sheets 11, 12, and 13. The sheet 11, employed as the intermediate layer, contained carbon fibers 1 of an amount of 15–60 g/m$^2$ oriented in a predetermined direction and also containing carbon black of an average particle size of 0.01 μm in the matrix resin liquid in an amount of 10 wt. % to 100 parts by weight of said resin. Two prepeg sheets with carbon fiber content of 10–40 g/m$^2$, without carbon black, were employed as the surface layers 12, 13. These sheets 11, 12, 13 were laminated symmetrically in such a manner that the directions of fibers mutually cross orthogonally, then hardened for 1–2 hours at a temperature of 120°–150° C. and under a pressure of 5–15 kg/m$^2$, and then gradually cooled to obtain a plate of a thickness of 60–120 μm.

This plate material showed satisfactory flatness, appearance and light shielding property.

A shutter prepared with the light shielding blades obtained by punching said plate material showed, in a durability test, an improved durability because of the increased strength of the connecting parts for transmitting the driving force, since the material was free from internal cavities and was improved in mechanical strength. [2nd embodiment]

Figure 2:
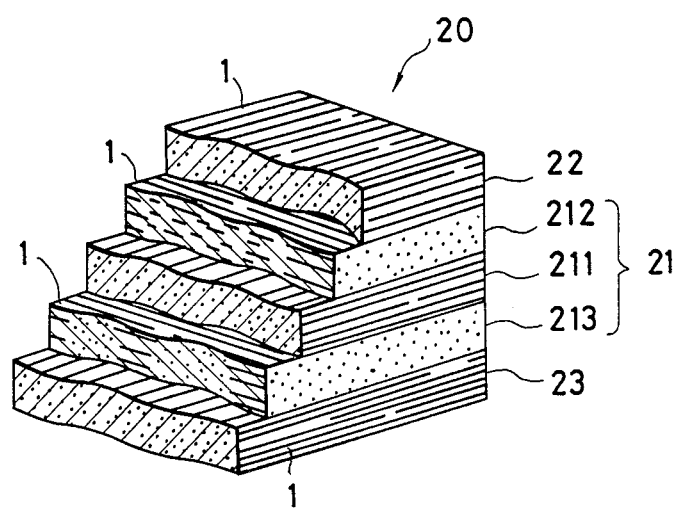

FIG. 2 shows a second embodiment of the invention. To form an intermediate layer 21, three prepreg sheets 211, 212, 213, containing carbon fibers in an amount of 10–30 g/m$^2$ and also containing carbon black of an average particle size of 0.015 μm in an amount of 5 wt. % were laminated symmetrically in such a manner that the directions of carbon fibers mutually cross orthogonally and then prepreg sheets containing carbon fibers in an amount of 10–40 g/m$^2$, but not containing carbon black, were laminated, as the surface layers 22, 23 in such a manner that the direction of carbon fibers in the surface layers was same as that of the central layer 211 of the intermediate layer. Then hardening was conducted in a similar manner as in the first embodiment to obtain a plate material of a thickness of 80–120 μm.

This plate material showed sufficient light shielding property, good flatness excellent appearance, satisfactory receptivity to DL coating, and an improved strength.

Figure 3:
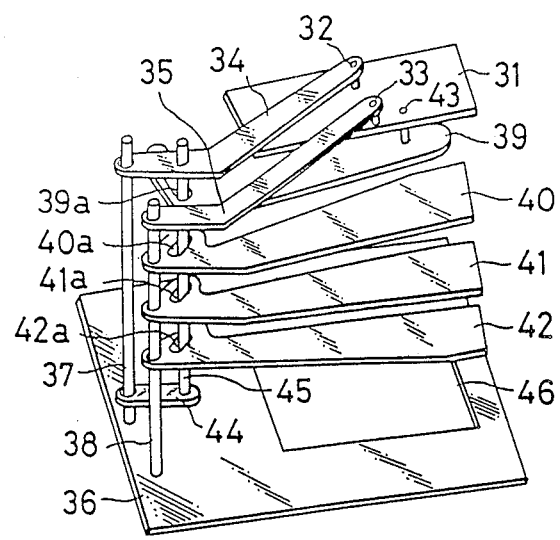
FIG. 3 is an assembly view of a light shielding device employing the plate of the present invention.

FIG. 3 is an assembly view of a vertically running focal plane shutter, employing the aboveexplained plate material for a first blade 31, a second blade 39, a third blade 40, a fourth blade 41, and a fifth blade 42.

Arms 34, 35 are respectively and pivotably connected to pins 32, 33 fixed on the first blade 31, and freely rotate about shafts 37, 38 fixed on a shutter substrate 36. Since the pins 32, 33 and the shafts 37, 38 are substantially so positioned as to form a parallelogram, the first blade 31 performs a parallel displacement in the vertical direction of an aperture 46, by the rotation of the arms 32, 33. However the second, third, fourth and, fifth blades 39, 40, 41, 42 move differently from the first blade. A pin 43 fixed on the first blade 31 is rotatably coupled with the second blade 39, which is provided, at the base portion thereof, with a cam groove 39a engaging with a pin 45 fixed on an arm 44 rotatably supported by the shaft 37. Consequently the movement of the second blade 39 is determined, through the pin 43, by the movement of the pin 45 and the form of the cam groove 39a. The third blade 40 is rotatably supported by the shaft 38 and is provided, at the base portion thereof, with a cam groove 40a engaging with the pin 45. Similarly the fourth and fifth blades 41, 42 are rotatably supported by the shaft 38 and are respectively provided with cam grooves 41a, 42a engaging with the pin 45. Said pin 45 is also rotatably linked with the arm 34 rotatably supported by the shaft 37, and rotates with the arm 44 rotating about the shaft 37. The cam grooves 39a, 40a, 41a, 42a of the blades are so formed that said blades are extended to cover the aperture when the first blade 31 is in the upper portion of the aperture 46, but said blades mutually overlap when the first blade 31 is retracted below the aperture. In this case, three blades from third to fifth (40–42) rotate about the shaft 38 as in a folding fan. In such a focal plane shutter there is usually provided another set of similar blades, wherein a set of blades is used as a shutter opening member while the other set is used as a shutter closing member, functioning with a time lag therebetween.

In such a focal plane shutter, the conventional plate material often resulted in malfunction in the connecting portions with the driving system, since the plate material had poor flatness and tended to from microcracks and cavities, leading to localized decreases in strength. Also such plate material was associated with poor appearance and poor receptivity for the DL coating.

On the other hand, the light shielding blade obtained by punching the plate material of the present invention is stronger, without internal cavities, so that it provides an improved strength for the connecting portion and an improved durability. In addition, said light shielding blade is excellent in flatness, appearance, receptivity for DL coating, and light shielding property.

Also the significantly improved production yield reduces the cost and significantly contributes to the realization of ultra high speed light shielding blades for a shutter of 1/8000 seconds. The pigment-prepreg sheets are expensive and require a complex process to produce, but the halved use of such prepreg sheets also favorably contributes to the cost reduction.

What is claimed is:

1. A thin plate having a thickness of 60 to 120 μm and comprising a laminate of at least three carbon fiber reinforced resin sheets each having continuous carbon fibers oriented in a predetermined direction and enveloped in a resin matrix, with a light-shielding intermediate one of said sheets containing black pigment in an amount of 5 to 15 wt. % and two outer ones of said sheets being substantially devoid of black pigment.

2. A thin plate according to claim 1, obtained by laminating a plurality of prepregs respectively constituted by said reinforced resin sheets, followed by hardening with heat in a pressed state.

3. A light shielding blade comprising a laminate of at least three carbon fiber reinforced resin sheets each having continuous carbon fibers oriented in a predetermined direction and enveloped in a resin matrix, with a light-shielding intermediate one of said sheets containing black pigment in an amount of 5 to 15 wt. % and two outer ones of said sheets being substantially devoid of black pigment.

4. A light shielding blade according to claim 3, wherein said reinforced resin sheets are laminated in such a manner that said continuous fibers contained in each sheet are oriented orthogonally to those in each adjacent sheet.

5. A light shielding blade according to claim 3, wherein said reinforced resin sheets are laminated in plane symmetric manner.

6. A light shielding blade according to claim 3, wherein each of said reinforced resin sheets has a thickness of 10 to 60 $\mu$m and contains carbon fibers in an amount of 10 to 60 g/m$^2$.

7. A light shielding blade according to claim 3, wherein said black pigment is carbon black with an average particle size not exceeding 0.07 $\mu$m.

8. A light shielding blade according to claim 3, having a thickness of 60 to 120 $\mu$m.

9. A shutter blade comprising a laminate of at least three carbon fiber reinforced resin sheets each having continuous carbon fibers oriented in a predetermined direction and enveloped in a resin matrix, with a light-shielding intermediate one of said sheets containing black pigment in an amount of 5 to 15 wt. % and two outer ones of said sheets being substantially devoid of black pigment.

10. A shutter blade according to claim 9, wherein said reinforced resin sheets are laminated in such a manner that said continuous fibers contained in each sheet are oriented orthogonally to those in each adjacent sheet.

11. A shutter blade according to claim 9, wherein said reinforced resin sheets are laminated in plane symmetric manner.

12. A shutter blade according to claim 9, wherein each of said reinforce resin sheets has a thickness of 10 to 60 $\mu$m, and contains carbon fibers in an amount of 10 to 60 g/m$^2$.

13. A shutter blade according to claim 9, wherein said black pigment is carbon black of an average particle size not exceeding 0.07 $\mu$m.

14. A shutter blade according to claim 9, having a thickness of 60 to 120 $\mu$m.

* * * * *